US012715361B2

(12) United States Patent
Buerkle

(10) Patent No.: US 12,715,361 B2
(45) Date of Patent: Aug. 25, 2026

(54) VEHICULAR INTERIOR REARVIEW MIRROR WITH INFRARED FILTERING VIA LIGHT SENSOR AND PROCESSING

(71) Applicant: Magna Mirrors of America, Inc., Holland, MI (US)

(72) Inventor: Austin T. Buerkle, Grand Rapids, MI (US)

(73) Assignee: Magna Mirrors of America, Inc., Holland, MI (US)

( * ) Notice: Subject to any disclaimer, the term of this patent is extended or adjusted under 35 U.S.C. 154(b) by 498 days.

(21) Appl. No.: 18/351,610

(22) Filed: Jul. 13, 2023

(65) Prior Publication Data

US 2024/0017671 A1 Jan. 18, 2024

Related U.S. Application Data

(60) Provisional application No. 63/368,494, filed on Jul. 15, 2022.

(51) Int. Cl.
*B60R 1/08* (2006.01)
*B60R 1/04* (2006.01)

(52) U.S. Cl.
CPC ................ *B60R 1/088* (2013.01); *B60R 1/04* (2013.01)

(58) Field of Classification Search
CPC .................................. B60R 1/088; B60R 1/04
USPC .......................................................... 359/604
See application file for complete search history.

(56) References Cited

U.S. PATENT DOCUMENTS

| | | | |
|---|---|---|---|
| 7,914,187 | B2 | 3/2011 | Higgins-Luthman et al. |
| 9,405,120 | B2 | 8/2016 | Graf et al. |
| 10,017,114 | B2 | 7/2018 | Bongwald |
| 10,029,614 | B2 | 7/2018 | Larson |
| 10,046,706 | B2 | 8/2018 | Larson et al. |
| 10,065,574 | B2 | 9/2018 | Tiryaki |
| 10,166,924 | B2 | 1/2019 | Baur |
| 10,421,404 | B2 | 9/2019 | Larson et al. |
| 10,442,360 | B2 | 10/2019 | LaCross et al. |
| 10,948,798 | B2 | 3/2021 | Lynam et al. |
| 10,958,830 | B2 | 3/2021 | Koravadi |
| 10,967,796 | B2 | 4/2021 | Uken et al. |
| 11,214,199 | B2 | 1/2022 | LaCross et al. |
| 11,242,008 | B2 | 2/2022 | Blank et al. |
| 11,518,401 | B2 | 12/2022 | Kulkarni |
| 11,639,134 | B1 | 5/2023 | Huizen et al. |

(Continued)

*Primary Examiner* — Bumsuk Won
*Assistant Examiner* — Rahman Abdur
(74) *Attorney, Agent, or Firm* — HONIGMAN LLP

(57) ABSTRACT

A vehicular interior rearview mirror system includes an interior rearview mirror assembly having a mirror head adjustable relative to a mounting base. The mirror head includes a variable reflectance electro-optic mirror reflective element. A glare light sensor is disposed at the mirror head and captures sensor data representative of visible light and near infrared light passing through the variable reflectance electro-optic mirror reflective element. The vehicular interior rearview mirror system determines a near infrared light component of the captured sensor data. Based on processing of the captured sensor data, the system controls dimming of the variable reflectance electro-optic mirror reflective element. The system does not rely on the determined near infrared light component of the captured sensor data when controlling dimming of the variable reflectance electro-optic mirror reflective element.

30 Claims, 5 Drawing Sheets

(56) References Cited

U.S. PATENT DOCUMENTS 11,780,372 B2 10/2023 Sobecki et al.
11,827,153 B2 11/2023 Miller et al.
2015/0092042 A1 4/2015 Fursich
2015/0232030 A1 8/2015 Bongwald
2015/0294169 A1 10/2015 Zhou et al.
2015/0296135 A1 10/2015 Wacquant et al.
2015/0352953 A1 12/2015 Koravadi
2016/0137126 A1 5/2016 Fursich et al.
2016/0209647 A1 7/2016 Fursich
2017/0217367 A1 8/2017 Pflug et al.
2017/0274906 A1 9/2017 Hassan et al.
2017/0355312 A1 12/2017 Habibi et al.
2018/0222414 A1 8/2018 Ihlenburg et al.
2018/0231976 A1 8/2018 Singh
2019/0118717 A1 4/2019 Blank et al.
2019/0146297 A1 5/2019 Lynam et al.
2019/0210615 A1 7/2019 Caron et al.
2019/0258131 A9 8/2019 Lynam et al.
2020/0143560 A1 5/2020 Lu et al.
2020/0202151 A1 6/2020 Wacquant
2020/0320320 A1 10/2020 Lynam
2020/0377022 A1 12/2020 LaCross et al.
2021/0155167 A1 5/2021 Lynam et al.
2021/0162926 A1 6/2021 Lu
2021/0245662 A1* 8/2021 Blank ................. B60R 11/0235
2021/0291739 A1 9/2021 Kasarla et al.
2021/0323473 A1 10/2021 Peterson et al.
2022/0242438 A1 8/2022 Sobecki et al.
2022/0254132 A1 8/2022 Rother
2022/0377219 A1 11/2022 Conger et al.
2024/0064274 A1 2/2024 Blank et al.

* cited by examiner

VEHICULAR INTERIOR REARVIEW MIRROR WITH INFRARED FILTERING VIA LIGHT SENSOR AND PROCESSING

CROSS REFERENCE TO RELATED APPLICATION

The present application claims the filing benefits of U.S. provisional application Ser. No. 63/368,494, filed Jul. 15, 2022, which is hereby incorporated herein by reference in its entirety.

FIELD OF THE INVENTION

The present invention relates generally to the field of interior rearview mirror assemblies for vehicles.

BACKGROUND OF THE INVENTION

It is known to provide a mirror assembly that is adjustably mounted to an interior portion of a vehicle, such as via a double ball pivot or joint mounting configuration where the mirror casing and reflective element are adjusted relative to the interior portion of a vehicle by pivotal movement about the double ball pivot configuration. The mirror casing and reflective element are pivotable about either or both of the ball pivot joints by a user that is adjusting a rearward field of view of the reflective element. The mirror reflective element may include an electrochromic mirror reflective element including a front glass substrate and a rear glass substrate with an electrochromic medium sandwiched between the glass substrates and bounded by a perimeter seal.

SUMMARY OF THE INVENTION

A vehicular interior rearview mirror system includes an interior rearview mirror assembly that includes a mirror head adjustably attached at a mounting base. The mounting base is configured for attachment at an interior portion of a vehicle. The mirror head includes a variable reflectance electro-optic mirror reflective element. A sensor is disposed at the mirror head and senses through the variable reflectance electro-optic mirror reflective element. The sensor captures sensor data representative of (i) visible light passing through the mirror reflective element, and (ii) near infrared light passing through the mirror reflective element. An electronic control unit (ECU) is electrically connected to the mirror reflective element and includes electronic circuitry and associated software, the electronic circuitry including a data processor for processing sensor data captured by the sensor. Based on processing at the ECU of the captured sensor data, a mirror dimming driver or system (or the vehicular interior rearview mirror system) controls dimming of the variable reflectance electro-optic mirror reflective element. The system, based on processing at the ECU of the captured sensor data, determines a near infrared light component of the captured sensor data. For example, the system may identify the near infrared light component as noise present in the captured sensor data representative of visible light. The system, based on the determined near infrared light component, determines a level of visible light passing through the mirror reflective element. Based on the determined level of visible light passing through the mirror reflective element (which may be determined by removing the noise from the raw visible light sensor data), the mirror dimming system adjusts dimming of the variable reflectance electro-optic mirror reflective element.

These and other objects, advantages, purposes and features of the present invention will become apparent upon review of the following specification in conjunction with the drawings.

DESCRIPTION OF THE PREFERRED EMBODIMENTS

Figure 1:
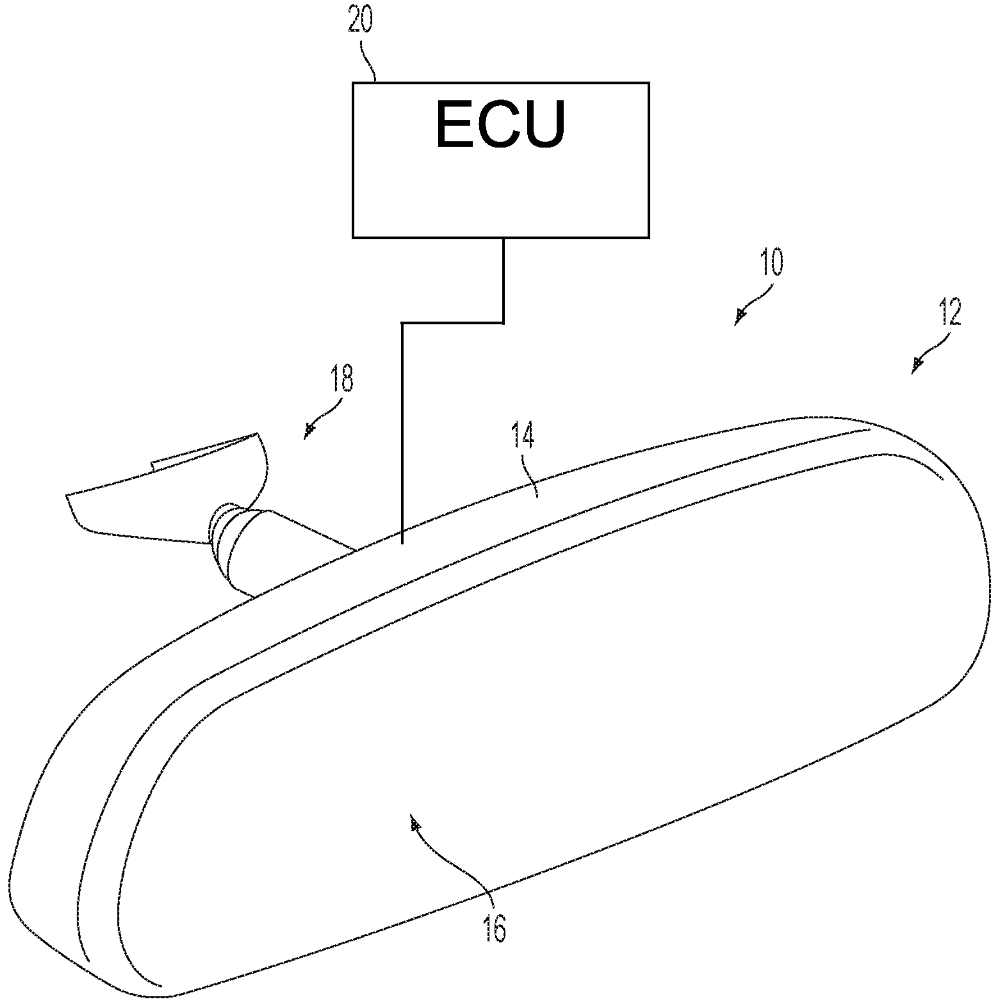
FIG. 1 is a perspective view of an interior rearview mirror assembly.

Referring now to the drawings and the illustrative embodiments depicted therein, an interior rearview mirror assembly 10 for a vehicle includes a mirror head 12 that includes a casing 14 and a mirror reflective element 16 positioned at a front portion of the casing 14 (FIG. 1). In the illustrated embodiment, the mirror head 12 is configured to be adjustably mounted to an interior portion of a vehicle (such as to an interior or in-cabin surface of a vehicle windshield or a headliner of a vehicle or the like) via a mounting structure or mounting configuration or assembly 18. The mirror reflective 16 element includes a variable reflectance mirror reflective element that varies its reflectance responsive to electrical current applied to conductive coatings or layers of the reflective element. For example, the interior rearview mirror assembly and the variable reflectance electro-optic mirror reflective element may include characteristics of the mirror assemblies described in U.S. Pat. Nos. 7,626,749; 7,274,501; 7,255,451; 7,195,381; 7,184,190; 6,690,268; 5,140,455; 5,151,816; 6,178,034; 6,154,306; 6,002,511; 5,567,360; 5,525,264; 5,406,414; 5,253,109; 5,076,673; 5,073,012; 5,115,346; 5,724,187; 5,668,663; 5,142,407; 5,066,112; 6,449,082 and/or 4,712,879, which are hereby incorporated herein by reference in their entireties.

The interior rearview mirror assembly 10 includes the electrochromic mirror reflective element 16 that varies its reflectance (i.e., a brightness or dimming effect of the light reflected by the mirror reflective element) based on a determined ambient light level and/or based on a determined glare light level. For example, the ambient light level may be determined using an ambient light sensor at the mirror head and the glare light level may be determined via a rearward sensing sensor at the mirror head that senses light from rearward of the vehicle and incident at the mirror reflective element, such as a glare light sensor or camera that senses light from headlights of trailing vehicles at the mirror reflective element. When glare light is greater and/or ambient light is reduced, the mirror reflective element is dimmed or darkened and reflects less light. When glare light is reduced and/or ambient light is greater, the mirror reflective element is not dimmed or darkened and reflects more light to, for example, improve the visibility and clarity of the view provided by the mirror reflective element to the driver of the vehicle.

The glare light level and/or ambient light level and the resultant electric current delivered (via an EC drive circuit or mirror dimming control or system) to the electrochromic mirror reflective element 16 may be determined by processing sensor data representative of the light level in the vehicle at an electronic control unit (ECU) 20 of the vehicle that is in electronic communication with circuitry of the mirror assembly 10. The ECU 20 may be disposed at the mirror assembly 10 or at any suitable location within the vehicle. The ECU 20 includes electronic circuitry and associated software, including a data processor for processing the captured sensor data to determine the light level incident at the mirror reflective element. Optionally, the ECU 20 may process image data captured by an interior-viewing or interior rearward-viewing camera at the vehicle to determine the ambient light level (and optionally may determine glare light via processing of captured image data). For example, the interior camera or imaging sensor may include a driver monitoring camera or an occupant monitoring camera or the like.

Modern vehicles often include sensors that are sensitive to near infrared light or infrared light, such as driver monitoring cameras, with the driver monitoring systems including a near infrared or infrared light emitter that illuminates the driver's head region with near infrared or infrared light to enhance monitoring of the driver via the near infrared or infrared light sensitive camera. That is, vehicle systems may transmit or emit infrared light or near infrared light within the interior cabin of the vehicle so that infrared or near infrared imaging sensors (such as infrared or near infrared light sensitive cameras) may capture sensor data representative of reflected infrared or near infrared light. For example, driver monitoring systems that capture and process infrared sensor data may be used to determine driver conditions in low visible light conditions. However, these systems may cause the infrared light level present in the interior cabin of the vehicle to be so high that visible light sensors, such as those used to determine the glare light level for the electrochromic mirror reflective element, are not able to accurately and reliably determine the visible light levels present in the vehicle. That is, the infrared light may present itself as increased light or increased noise to the visible light sensors, causing the glare light sensor to read higher than it should and resulting in the electrochromic auto-dimming mirror to incorrectly dim or darken or color the electrochromic cell. Similarly, the infrared light may interfere with sensor data captured by an ambient light sensor disposed at the mirror head. Even light sensors with high infrared rejection (such as greater than 90 percent or more) may be adversely affected.

Figure 2:
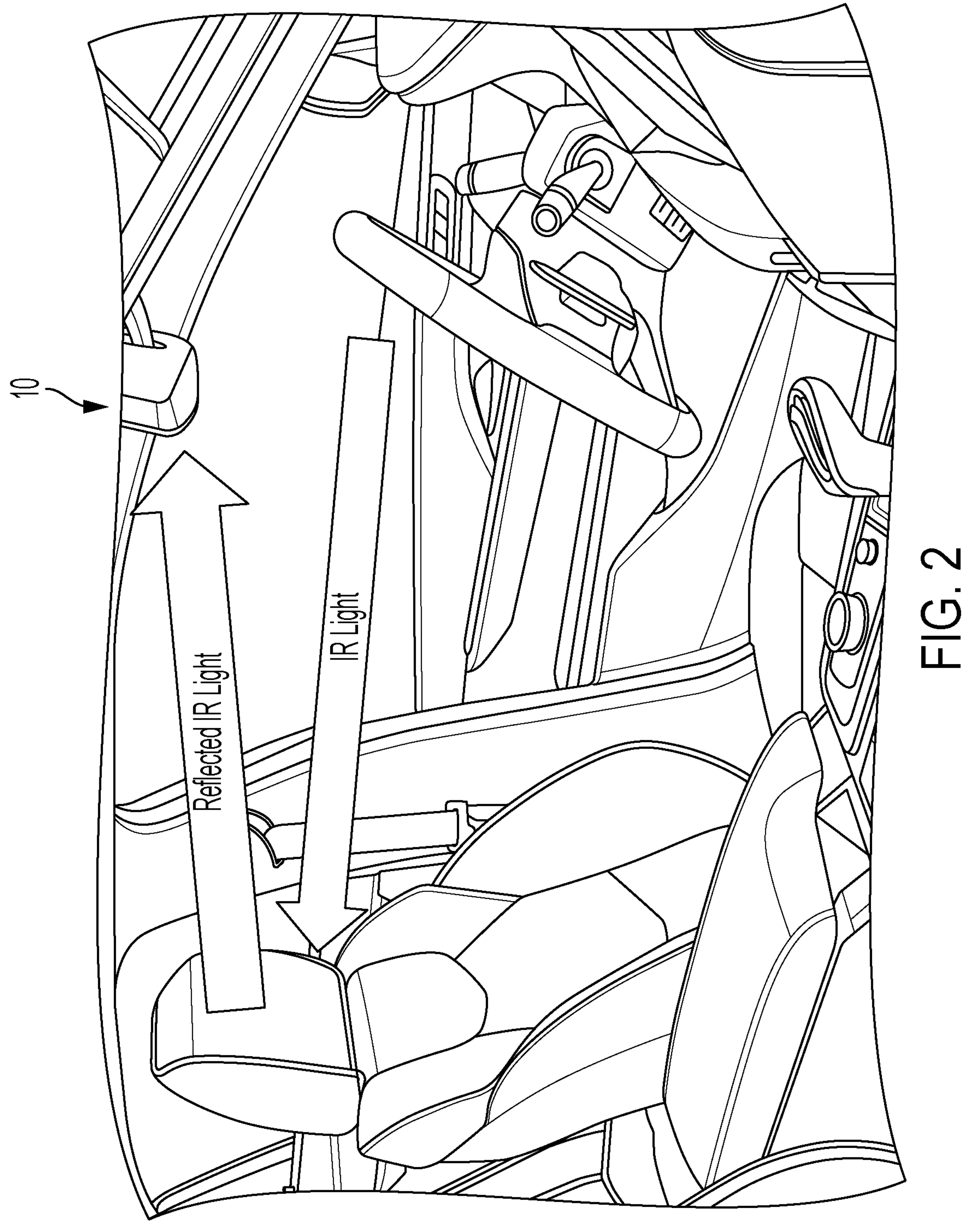
FIG. 2 is a perspective view of an interior portion of a vehicle showing infrared or near infrared light reflecting toward the interior rearview mirror assembly.

The visible light glare sensor that captures sensor data for controlling the dimming of the mirror reflective element may be disposed at or near the mirror assembly 10, such as behind the mirror reflective element 16 within the mirror head 12. Further, and as shown in FIG. 2, the infrared light or near infrared light emitted within the cabin may originate from the dashboard or gauge cluster or interior rearview mirror assembly 10 or other suitable interior portion of the vehicle and in front of the driver to illuminate a head region of the driver with near infrared or infrared light. Thus, the infrared light or near infrared light may reflect from the head region of the driver or interior surfaces of the vehicle and toward the visible light glare sensor at or near the mirror assembly 10.

Figure 3:
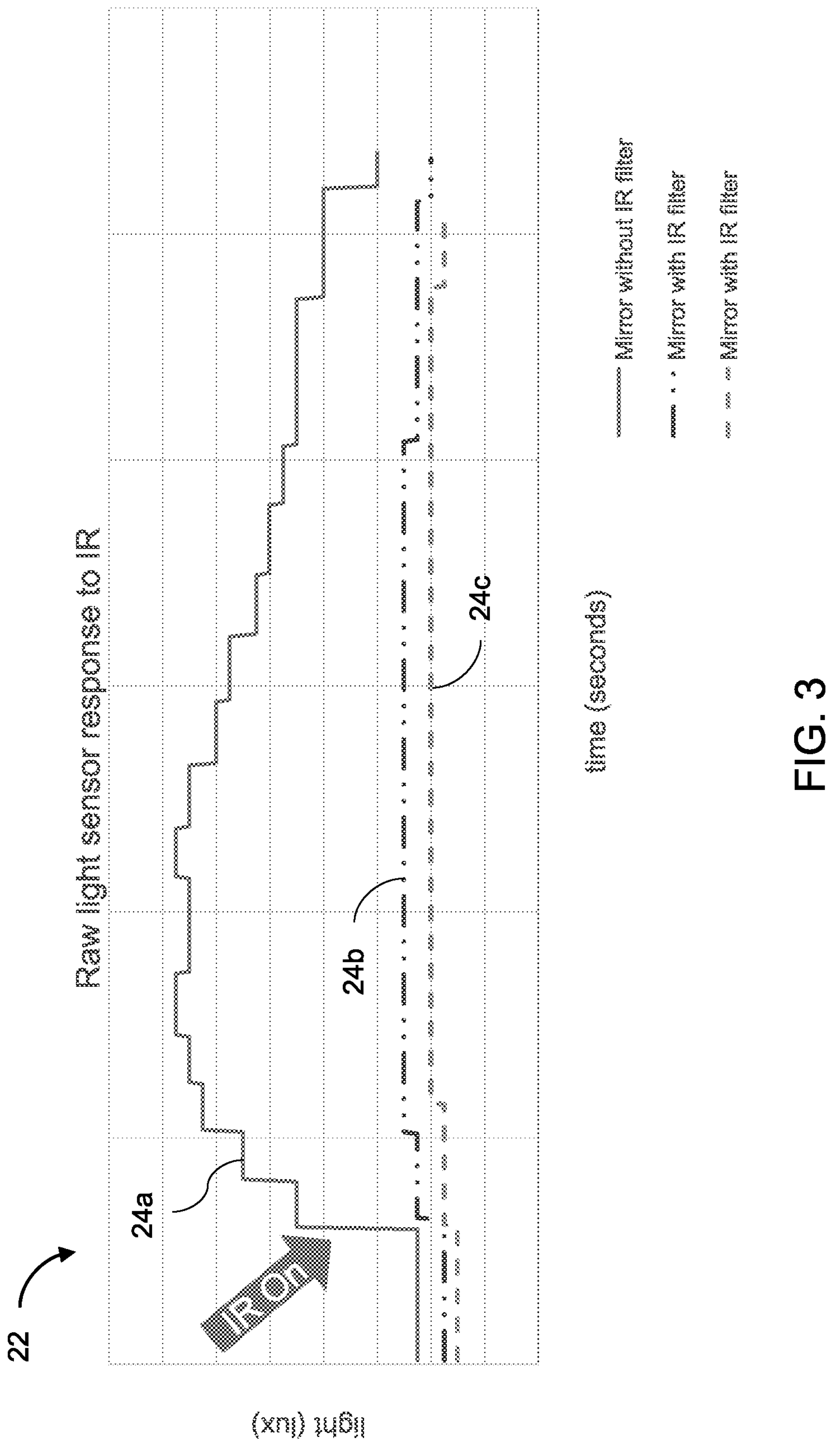
FIG. 3 is a graph comparing visible light levels detected by a light sensor disposed behind the mirror reflective element of an interior rearview mirror assembly that does not include an infrared or near infrared light filter and a light sensor disposed behind the mirror reflective element of an interior rearview mirror assembly that includes a physical infrared or near infrared light filter.

FIG. 3 depicts a graph 22 of exemplary visible light sensor readings captured by a light sensor 26 (FIG. 4) disposed behind the mirror reflective element 16. Line **24*a* represents light sensed by the light sensor 26 disposed behind a mirror reflective element that does not provide infrared or near infrared light filtering. As shown, when the near infrared light emitter (e.g., a light emitting diode that emits light having a wavelength of at least 800 nm, such as, for example, a wavelength of about 940 nm) is activated (see line 24*a* after the "IR ON" point), the light sensor output represented by line 24*a* increases as the light sensor detects visible and near infrared light. The large response (i.e., large sensor readings) shown by line 24*a* could push the mirror reflective element 16** deep into the electrochromic dimming or control curve. That is, because the light sensor behind the mirror reflective element that does not provide infrared or near infrared light filtering detects both visible and near infrared light, and because the electrochromic mirror reflective element dims or darkens based on the level of light detected by the light sensor, the mirror reflective element may be dimmed or darkened to a different degree than if the light sensor only detected visible light at the mirror reflective element. Because dimming of the mirror reflective element is intended to correct for or be adjusted based on visible light at the mirror reflective element, the increased levels of light detection from the near infrared light may result in incorrect dimming of the mirror reflective element. In other words, the dimming of the electrochromic mirror reflective element would not be adjusted properly for the visible light conditions because of the interference of the near infrared light. As used herein, infrared light and near infrared light refers to non-visible light having a wavelength of at least 800 nm, such as at least 900 nm or more.

Figure 4:
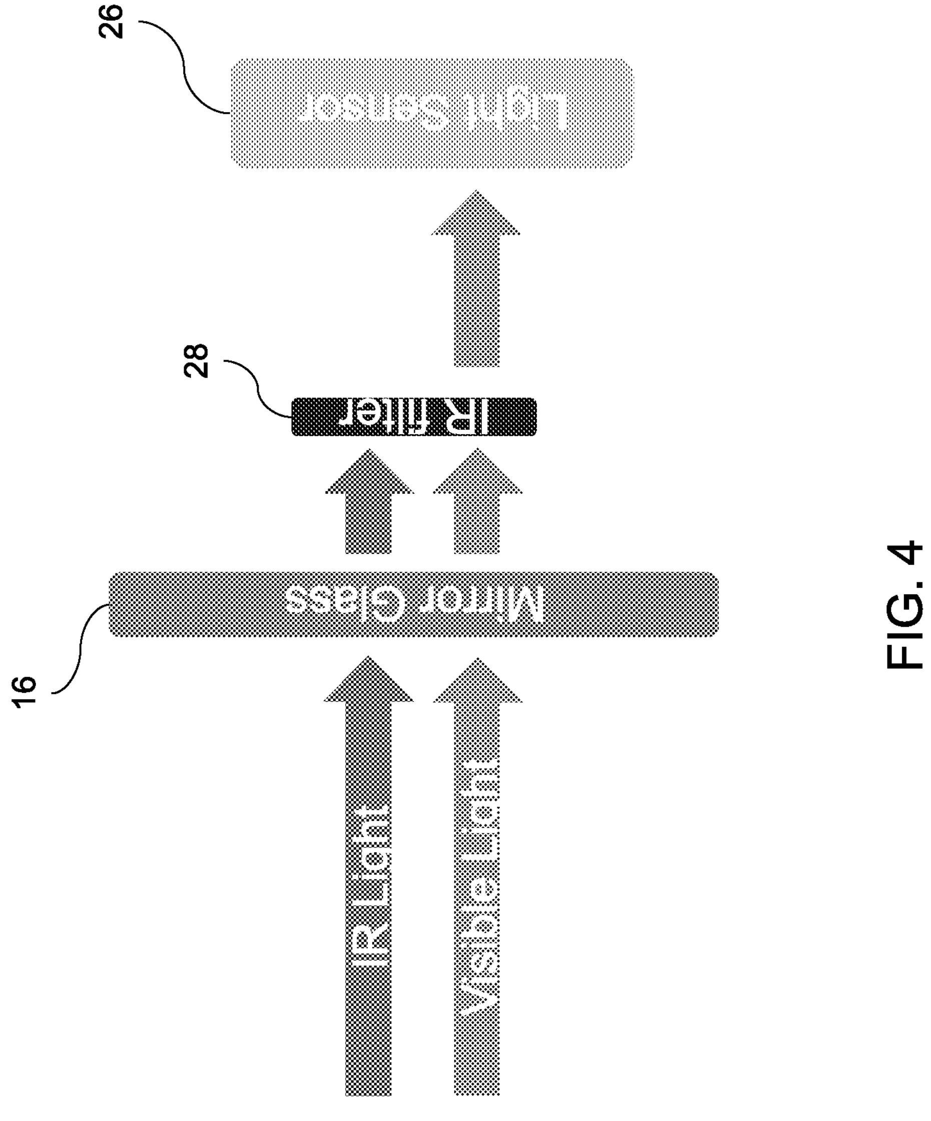
FIG. 4 is a schematic view of the interior rearview mirror assembly that includes the physical infrared or near infrared light filter.

Line **24*b* and line 24*c* in FIG. 3 each represent light sensed by the light sensor 26 disposed behind a mirror reflective element 16 with a physical infrared or near infrared light filter 28 (that filters or attenuates light having a wavelength of greater than about 800 nm) disposed between the mirror reflective glass 16 and the light sensor 26 (FIG. 4). As shown, the outputs of the light sensor represented by line 24*b* and 24*c* have very little response to the increase in near infrared light when the near infrared light emitter is activated (see lines 24*b* and 24*c* after the "IR ON" point). That is, the detected light level of the light sensor 26 disposed behind the mirror reflective element and the infrared or near infrared light filter 28 is less than the detected light level of the light sensor disposed behind the mirror reflective element that does not filter infrared or near infrared light. Thus, the physical infrared or near infrared light filter 28 is in the optical path of the light sensor 26** and filters out or attenuates at least some of the unwanted near infrared light and dimming of the mirror reflective element may be more accurately based on the level of visible light at the mirror reflective element.

Figure 5:
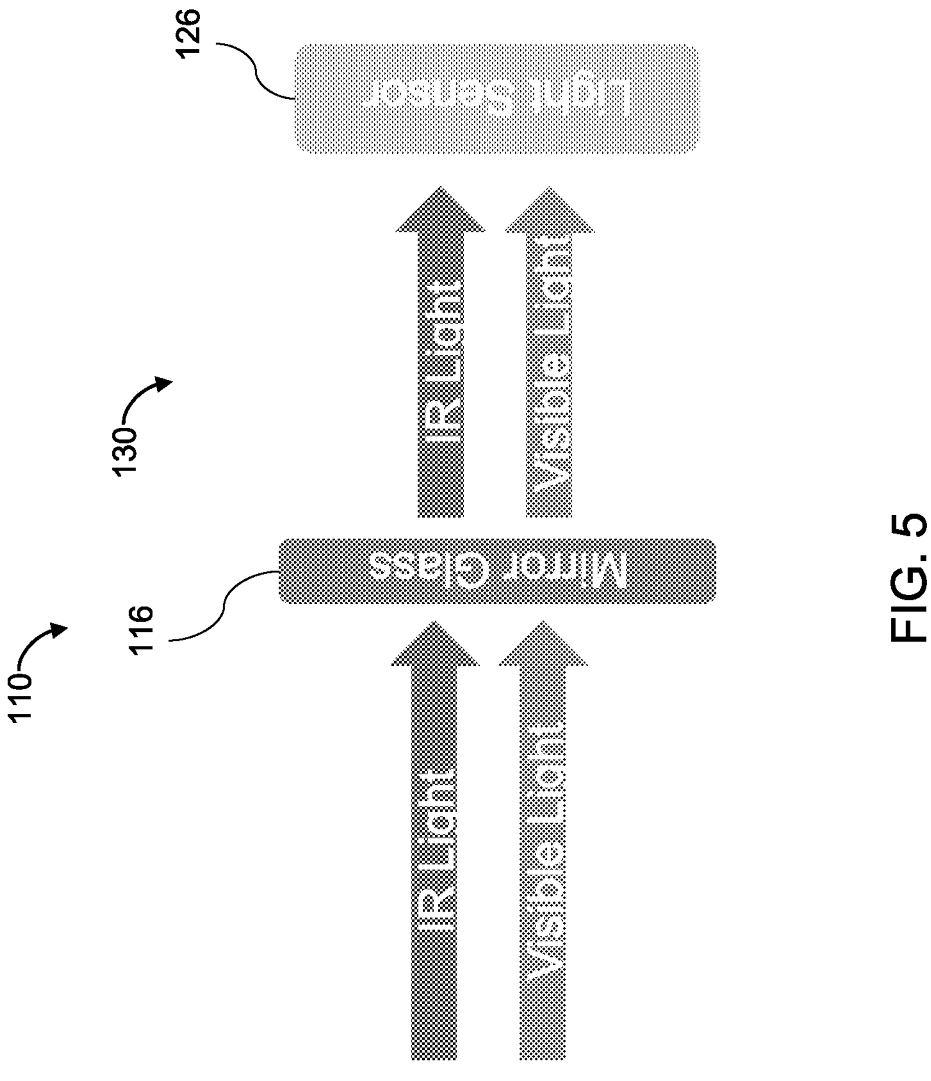
FIG. 5 is a schematic view of an interior rearview mirror assembly having a sensor disposed behind the mirror reflective element that includes a first channel sensitive to infrared or near infrared light and a second channel sensitive to visible light.

As shown in FIG. 5, an interior rearview mirror dimming system 130 uses a light sensor 126 disposed behind the mirror reflective element 116 of an interior rearview mirror assembly 110 to capture sensor data representative of visible light and near infrared light and the system 130 filters the noise caused by the near infrared light out of the visible light sensor data to determine a level of visible light present at the interior portion of the vehicle and/or incident at the mirror reflective element. That is, the system 130 ignores the near infrared light component of the sensor data to determine the filtered level of visible light passing through the mirror reflective element. Based on this filtered level of visible light, the dimming system 130 controls dimming of the mirror reflective element 116.

In other words, the mirror assembly 110 includes a light sensor 126 with a near infrared sensitive channel (sensitive to light having a wavelength of, for example, at least about 800 nm) and a visible light sensitive channel (sensitive to light having a wavelength of, for example, greater than about 400 nm and less than about 800 nm or less than about 700 nm) and the ECU processes the captured data representative of the light (including visible light and near infrared light) to subtract or ignore the near infrared light component or signals (i.e., the infrared "noise") from the visible light component or signals. That is, near infrared light and visible light may pass through the mirror reflective element 116 and sensor data representative of both the near infrared light and the visible light is captured by the light sensor 126. For example, the light sensor 126 may include at least one photosensing element that captures visible light and at least one photosensing element that captures infrared or near infrared light. The ECU processes the captured light to filter out or separate near infrared light detection from visible light detection and is configured to determine the visible light level incident on the mirror reflective element 116 for controlling operation of the electrochromic mirror reflective element. Thus, the mirror assembly 110 may not include a physical infrared or near infrared light filter.

Optionally, the interior rearview mirror assembly may include the physical infrared or near infrared light filter, the one or more photosensing elements or channels that detect levels of visible light and the one or more photosensing elements or channels that detect levels of infrared or near infrared light. Visible and infrared or near infrared light may pass through the mirror reflective element and the infrared or near infrared light filter to be detected by the respective photosensing elements. Although the infrared or near infrared light filter may preclude a significant portion of near infrared light from passing through to the photosensing elements (such as 75 percent or more, 90 percent or more, 95 percent or more and the like), some near infrared light may still pass through and be detected by the visible light detecting sensor (and thus may interfere with or artificially increase the detected levels of visible light). The near infrared light detecting sensor may detect the reduced level of near infrared light passing through the near infrared light filter and the detected levels of visible light may be corrected or reduced based on the detected levels of near infrared light. Thus, with the physical infrared or near infrared light filter, the system may correct for a reduced level of near infrared light than without the physical infrared or near infrared light filter.

Optionally, the dimming system 130 may include a first sensor that captures sensor data representative of visible light (such as an imaging sensor or a glare light sensor or an ambient light sensor or the like) and the system includes a second sensor that captures sensor data representative of infrared and near infrared light. Based on processing of near infrared sensor data captured by the second sensor, the system filters the sensor data captured by the first sensor to determine the visible light level for controlling dimming of the mirror reflective element. In other words, the system includes separate visible light and near infrared light sensitive sensors and filters or subtracts the near infrared light interference or noise from the visible light sensor output based on the near infrared light sensor data.

In some implementations, sensor data captured by the ambient light sensor may be filtered to remove a near infrared component of the captured ambient light sensor data. For example, the ambient light sensor may be configured to sense light passing through the windshield of the vehicle, and near infrared or infrared light may cause the sensor to sense a greater amount of light than what is visibly present. Thus, in a similar manner as described above, the captured ambient light sensor data may be processed to determine and remove or ignore a near infrared light component of the captured ambient light sensor data to determine the level of visible light passing through the windshield (i.e., the visible ambient light at the vehicle). Thus, the electro-optic mirror reflective element (and any other display at the vehicle where the brightness depends on the detected ambient light through the windshield) may be properly dimmed with reduced or eliminated interference from infrared or near infrared light.

Optionally, the light sensor 126 comprises an imaging sensor or camera that captures image data for a driver monitoring system (DMS) of the vehicle. Thus, the captured near infrared sensor data may be processed for the driver monitoring function and for filtering noise from the visible light sensor data. The image processor or controller (such as an EYEQ™ image processing chip available from Mobileye Vision Technologies Ltd. of Jerusalem, Israel, and such as an image processor of the types described in U.S. Pat. No. 9,126,525, which is hereby incorporated herein by reference in its entirety) may process image data captured by a rearward facing camera to assess glare lighting conditions (such as to detect headlights of following vehicles that may cause glare at the interior and/or exterior rearview mirror assemblies of the equipped vehicle), and the controller may further adjust or control the dimming of the electro-optic mirror assembly or assemblies of the equipped vehicle responsive to such image processing, such as by utilizing aspects of the systems described in U.S. Pat. Nos. 11,242,008; 10,967,796 and/or 10,948,798, and/or International Publication No. WO 2022/150826, which are all hereby incorporated herein by reference in their entireties.

In other words, the DMS camera 126 captures image data representative of visible light that passes through the mirror reflective element and image data representative of near infrared light that passes through the mirror reflective element. The image data representative of the near infrared light may be processed by the DMS for the driver monitoring function and for filtering the image data representative of the visible light to remove or ignore the near infrared light component of the visible light data. The filtered visible light data is processed for controlling operation of the electrochromic mirror reflective element.

Optionally, the DMS may process image data representative of visible light and image data representative of near infrared light for the driver monitoring function and the DMS may adjust processing of the visible light or near infrared light based on determined levels of visible light and near infrared light. That is, based on the determined near infrared light level being below a threshold level of near infrared light (or visible light level being greater than or equal to an ambient light threshold), the visible light image data may be processed at the ECU for the driver monitoring function. Based on the determined near infrared light level being greater than or equal to the threshold level (or visible light level being less than or equal to an ambient light threshold), the near infrared light image data may be processed at the ECU for the driver monitoring function.

Further, the DMS may process both the visible light image data and the near infrared light image data for the driver monitoring function and adjust weighting based on determined visible light and near infrared light. For example, based on determination of lower levels of near infrared light and/or determination of higher levels of visible light passing through the mirror reflective element, the DMS may increase weighting of the processing of image data representative of visible light and/or decrease weighting of the processing of image data representative of near infrared light for the driver monitoring function. Based on determination of higher levels of near infrared light and/or determination of lower levels of visible light passing through the mirror reflective element, the DMS may increase the weight of the processing of image data representative of near infrared light and/or decrease weighting of the processing of image data representative of visible light for the driver monitoring function.

Further, when a high level of noise is determined in the captured image data (e.g., when near infrared light is determined to interfere with image data representative of visible light or when visible light is determined to interfere with image data representative of near infrared light), the DMS may reduce weighting or confidence of determined driver behaviors. When a low level of noise is determined in the captured image data, the DMS may increase weighting or confidence of determined driver behaviors. For example, an advanced driver assist system (ADAS) of the vehicle, such as an adaptive cruise control system, may adjust a level of control of the vehicle based on a level of attentiveness of the driver determined by the DMS. The DMS may adjust confidence of the determined level of attentiveness communicated to the ADAS based on the determined levels of near infrared light present in the captured image data representative of visible light.

Optionally, to conserve processing power, the system may only process image data representative of near infrared light when an infrared light or near infrared light emitter of the DMS is electrically operated to emit infrared light or near infrared light within the vehicle cabin. For example, during daytime driving conditions with high levels of visible light, the DMS may not operate the near infrared light emitter and the system may process image data representative of visible light for the driver monitoring function and for controlling operation of the electrochromic mirror reflective element, and may not process image data representative of near infrared light. During nighttime driving conditions with low levels of visible light, the DMS operates the near infrared light emitter and the system processes the image data representative of near infrared light, as discussed above.

Optionally, the system may episodically process image data representative of near infrared light to determine the level of near infrared light passing through the mirror reflective element. If the determined level of near infrared light is above a threshold level of near infrared light, the system may continue processing the image data representative of near infrared light to filter the determined level of visible light and thus correct or adjust control of the electrochromic mirror element. If the determined level of near infrared light is below the threshold level of near infrared light, the system may cease processing of the image data representative of near infrared light and continue controlling the electrochromic mirror element based on the unfiltered determined level of visible light.

In some implementations, the interior mirror assembly comprises a dual-mode interior rearview video mirror that can switch from a traditional reflection mode to a live-video display mode. In such implementations, the dimming system 130 may determine the level of visible light present at the interior portion of the vehicle to determine control brightness of the video display at the mirror. For example, the mirror assembly may utilize aspects of the mirror assemblies and systems described in U.S. Pat. Nos. 11,242,008; 11,214,199; 10,442,360; 10,421,404; 10,166,924; 10,046,706 and/or 10,029,614, and/or U.S. Publication Nos. US-2021-0162926; US-2021-0155167; US-2020-0377022; US-2019-0258131; US-2019-0146297; US-2019-0118717 and/or US-2017-0355312, which are all hereby incorporated herein by reference in their entireties. The video display screen of the video mirror, when the mirror is in the display mode, may display video images derived from video image data captured by a rearward viewing camera, such as a rearward camera disposed at a center high-mounted stop lamp (CHMSL) location, and/or video image data captured by one or more other cameras at the vehicle, such as side-mounted rearward viewing cameras or the like, such as by utilizing aspects of the display systems described in U.S. Pat. No. 11,242,008, which is hereby incorporated herein by reference in its entirety.

The mirror casing may include a bezel portion that circumscribes a perimeter region of the front surface of the reflective element, or the perimeter region of the front surface of the reflective element may be exposed (such as by utilizing aspects of the mirror reflective elements described in U.S. Pat. Nos. 9,827,913; 9,598,016; 9,346,403; 8,508,831 and/or 8,730,553, which are hereby incorporated herein by reference in their entireties).

The mirror assembly may comprise any suitable construction, such as, for example, a mirror assembly with the reflective element being nested in the mirror casing and with a bezel portion that circumscribes a perimeter region of the front surface of the reflective element, or with the mirror casing having a curved or beveled outermost exposed perimeter edge around the reflective element and with no overlap onto the front surface of the reflective element (such as by utilizing aspects of the mirror assemblies described in U.S. Pat. Nos. 7,184,190; 7,274,501; 7,255,451; 7,289,037; 7,360,932; 7,626,749; 8,049,640; 8,277,059 and/or 8,529,108, which are hereby incorporated herein by reference in their entireties) or such as a mirror assembly having a rear substrate of an electro-optic or electrochromic reflective element nested in the mirror casing, and with the front substrate having a curved or beveled outermost exposed perimeter edge, (and with electrochromic mirrors of such construction commercially available from the assignee of this application under the trade name INFINITY™ mirror).

As discussed above, the mirror assembly may comprise an electro-optic or electrochromic mirror assembly that includes an electro-optic or electrochromic reflective element. The perimeter edges of the reflective element may be encased or encompassed by the perimeter element or portion of the bezel portion to conceal and contain and envelop the perimeter edges of the substrates and the perimeter seal disposed therebetween. The electrochromic mirror element of the electrochromic mirror assembly may utilize the principles disclosed in commonly assigned U.S. Pat. Nos. 7,274,501; 7,255,451; 7,195,381; 7,184,190; 6,690,268; 5,140,455; 5,151,816; 6,178,034; 6,154,306; 6,002,544; 5,567,360; 5,525,264; 5,610,756; 5,406,414; 5,253,109; 5,076, 673; 5,073,012; 5,724,187; 5,668,663; 5,910,854; 5,142,407 and/or 4,712,879, which are hereby incorporated herein by reference in their entireties.

Optionally, the mirror assembly may include one or more other displays, such as the types disclosed in U.S. Pat. Nos. 5,530,240 and/or 6,329,925, which are hereby incorporated herein by reference in their entireties, and/or display-on-demand transflective type displays, and/or video displays or display screens, such as the types disclosed in U.S. Pat. Nos. 8,890,955; 7,855; 755; 7,338,177; 7,274,501; 7,255,451; 7,195,381; 7,184,190; 7,046,448; 5,668,663; 5,724,187; 5,530,240; 6,329,925; 6,690,268; 7,734,392; 7,370,983; 6,902,284; 6,428,172; 6,420,975; 5,416,313; 5,285,060; 5,193,029 and/or 4,793,690, and/or in U.S. Pat. Pub. Nos. US-2006-0050018; US-2009-0015736; US-2009-0015736; and/or US-2010-0097469, which are all hereby incorporated herein by reference in their entireties.

The mirror assembly may include a camera or sensor or light of a driver monitoring system and/or head and face direction and position tracking system and/or eye tracking system and/or gesture recognition system. Such head and face direction and/or position tracking systems and/or eye tracking systems and/or gesture recognition systems may utilize aspects of the systems described in U.S. Pat. Nos. 11,518,401; 10,958,830; 10,017,114; 9,405,120 and/or 7,914,187, and/or U.S. Publication Nos. US-2022-0377219; US-2022-0254132; US-2022-0242438; US-2021-0323473; US-2021-0291739; US-2020-0320320; US-2020-0202151; US-2020-0143560; US-2019-0210615; US-2018-0231976; US-2018-0222414; US-2017-0274906; US-2017-0217367; US-2016-0209647; US-2016-0137126; US-2015-0352953; US-2015-0296135; US-2015-0294169; US-2015-0232030; US-2015-0092042; US-2015-0022664; US-2015-0015710; US-2015-0009010 and/or US-2014-0336876, and/or International Publication Nos. WO 2023/034956; WO 2022/241423 and/or WO 2022/187805, and/or International PCT Application No. PCT/US2023/021799, filed May 11, 2023, which are all hereby incorporated herein by reference in their entireties.

The sensor or sensors may comprise any type of sensor or sensors, such as imaging sensors or the like. The imaging sensor or camera may capture image data for image processing and may comprise, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. The imaging array may comprise a CMOS imaging array having at least 300,000 photosensor elements or pixels, preferably at least 500,000 photosensor elements or pixels and more preferably at least one million photosensor elements or pixels or at least three million photosensor elements or pixels or at least five million photosensor elements or pixels arranged in rows and columns. The imaging array may capture color image data, such as via spectral filtering at the array, such as via an RGB (red, green and blue) filter or via a red/red complement filter or such as via an RCC (red, clear, clear) filter or the like. The camera and mirror dimming functions may utilize aspects of the systems described in U.S. Pat. Nos. 10,967,796 and/or 10,948,798, and/or International Publication No. WO 2022/150826, which are all hereby incorporated herein by reference in their entireties.

Changes and modifications in the specifically described embodiments may be carried out without departing from the principles of the present invention, which is intended to be limited only by the scope of the appended claims as interpreted according to the principles of patent law.

The invention claimed is:

1. A vehicular interior rearview mirror system, the vehicular interior rearview mirror system comprising:

an interior rearview mirror assembly comprising (i) a mounting base configured for attachment at an interior portion of a vehicle equipped with the vehicular interior rearview mirror system and (ii) a mirror head adjustable relative to the mounting base;

wherein the mirror head comprises a variable reflectance electro-optic mirror reflective element;

a glare light sensor disposed at the mirror head, wherein the glare light sensor captures sensor data representative of (i) visible light passing through the variable reflectance electro-optic mirror reflective element and (ii) near infrared light passing through the variable reflectance electro-optic mirror reflective element;

wherein the glare light sensor comprises an imaging sensor that captures image data for a driver monitoring system of the vehicle;

an electronic control unit (ECU), wherein the ECU comprises electronic circuitry and associated software, and wherein the electronic circuitry comprises a data processor for processing sensor data captured by the glare light sensor;

wherein the vehicular interior rearview mirror system, based on processing at the ECU of the captured sensor data, determines a near infrared light component of the captured sensor data;

wherein the vehicular interior rearview mirror system, based on processing at the ECU of the captured sensor data, controls dimming of the variable reflectance electro- optic mirror reflective element;

wherein the vehicular interior rearview mirror system does not rely on the determined near infrared light component of the captured sensor data when controlling dimming of the variable reflectance electro-optic mirror reflective element;

wherein the captured sensor data representative of visible light passing through the variable reflectance electro-optic mirror reflective element and the captured sensor data representative of near infrared light passing through the variable reflectance electro-optic mirror reflective element are processed at the ECU for the driver monitoring system of the vehicle; and wherein, based on the determined near infrared light component of the captured sensor data being less than a threshold level of near infrared light, (i) reliance on processing of the captured sensor data representative of visible light passing through the variable reflectance electro-optic mirror reflective element for the driver monitoring system of the vehicle is increased and (ii) reliance on processing of the captured sensor data representative of near infrared light passing through the variable reflectance electro-optic mirror reflective element for the driver monitoring system of the vehicle is reduced.

2. The vehicular interior rearview mirror system of claim 1, wherein the vehicular interior rearview mirror system determines a level of visible light passing through the variable reflectance electro-optic mirror reflective element based on the determined near infrared light component of the captured sensor data.

3. The vehicular interior rearview mirror system of claim 2, wherein the vehicular interior rearview mirror system ignores the determined near infrared light component of the captured sensor data when determining the level of visible light passing through the variable reflectance electro-optic mirror reflective element.

4. The vehicular interior rearview mirror system of claim 1, wherein the ECU is disposed at the mirror head.

5. The vehicular interior rearview mirror system of claim 1, wherein the captured sensor data representative of near infrared light passing through the variable reflectance electro-optic mirror reflective element is processed at the ECU for the driver monitoring system of the vehicle.

6. The vehicular interior rearview mirror system of claim 1, wherein, based on the determined near infrared light component of the captured sensor data being above the threshold level of near infrared light, (i) reliance on processing of the captured sensor data representative of visible light passing through the variable reflectance electro-optic mirror reflective element for the driver monitoring system of the vehicle is reduced and (ii) reliance on processing of the captured sensor data representative of near infrared light passing through the variable reflectance electro-optic mirror reflective element for the driver monitoring system of the vehicle is increased.

7. The vehicular interior rearview mirror system of claim 1, wherein the glare light sensor comprises (i) at least one first photosensing element that captures sensor data representative of visible light, and (ii) at least one second photosensing element that captures sensor data representative of near infrared light.

8. The vehicular interior rearview mirror system of claim 1, wherein the interior rearview mirror assembly does not include a physical filter that attenuates non-visible light.

9. The vehicular interior rearview mirror system of claim 1, wherein captured sensor data is processed at the ECU to detect a headlight of a following vehicle.

10. The vehicular interior rearview mirror system of claim 1, further comprising an ambient light sensor disposed at the interior portion of the vehicle, wherein the ambient light sensor captures ambient light sensor data representative of (i) visible light at or near a windshield of the vehicle, and (ii) near infrared light at or near the windshield, and wherein the vehicular interior rearview mirror system controls dimming of the variable reflectance electro-optic mirror reflective element further based on processing at the ECU of the captured ambient light sensor data.

11. The vehicular interior rearview mirror system of claim 10, wherein the vehicular interior rearview mirror system, based on processing at the ECU of the captured ambient light sensor data, determines a near infrared light component of the captured ambient light sensor data, and wherein the vehicular interior rearview mirror system ignores the determined near infrared light component of the captured ambient light sensor data when determining a level of visible light at or near the windshield, and wherein the vehicular interior rearview mirror system adjusts dimming of the variable reflectance electro-optic mirror reflective element further based on the determined level of visible light at or near the windshield.

12. The vehicular interior rearview mirror system of claim 10, wherein the ambient light sensor is disposed at the mirror head.

13. The vehicular interior rearview mirror system of claim 1, wherein the glare light sensor further comprises an ambient light sensor that captures ambient light sensor data representative of (i) visible light and (ii) near infrared light, and wherein the vehicular interior rearview mirror system controls dimming of the variable reflectance electro-optic mirror reflective element further based on processing at the ECU of the captured ambient light sensor data.

14. The vehicular interior rearview mirror system of claim 13, wherein the imaging sensor has least one million photosensor elements arranged in rows and columns.

15. A vehicular interior rearview mirror system, the vehicular interior rearview mirror system comprising:

an interior rearview mirror assembly comprising (i) a mounting base configured for attachment at an interior portion of a vehicle equipped with the vehicular interior rearview mirror system and (ii) a mirror head adjustable relative to the mounting base;

wherein the mirror head comprises a variable reflectance electro-optic mirror reflective element;

an imaging sensor disposed at the mirror head, wherein the imaging sensor captures image data for a driver monitoring system of the vehicle;

wherein the imaging sensor captures image data representative of (i) visible light passing through the variable reflectance electro-optic mirror reflective element and (ii) near infrared light passing through the variable reflectance electro-optic mirror reflective element;

wherein the imaging sensor comprises (i) at least one first photosensing element that captures image data representative of visible light, and (ii) at least one second photosensing element that captures image data representative of near infrared light;

an electronic control unit (ECU), wherein the ECU comprises electronic circuitry and associated software, and wherein the electronic circuitry comprises an image processor for processing image data captured by the imaging sensor;

wherein the vehicular interior rearview mirror system, based on processing at the ECU of the captured image data, determines a near infrared light component of the captured image data;

wherein the vehicular interior rearview mirror system, based on processing at the ECU of the captured image data, determines glare light emanating from rearward of the vehicle and controls dimming of the variable reflectance electro-optic mirror reflective element based on the determined glare light;

wherein the vehicular interior rearview mirror system does not rely on the determined near infrared light component of the captured image data when determining the glare light and controlling dimming of the variable reflectance electro-optic mirror reflective element;

wherein the captured image data representative of visible light passing through the variable reflectance electro-optic mirror reflective element and the captured image data representative of near infrared light passing through the variable reflectance electro-optic mirror reflective element are processed at the ECU for the driver monitoring system of the vehicle;

wherein, based on the determined near infrared light component of the captured image data being above a threshold level of near infrared light, (i) reliance on processing of the captured image data representative of visible light passing through the variable reflectance electro-optic mirror reflective element for the driver monitoring system of the vehicle is reduced and (ii) reliance on processing of the captured image data representative of near infrared light passing through the variable reflectance electro-optic mirror reflective element for the driver monitoring system of the vehicle is increased; and wherein, based on the determined near infrared light component of the captured image data being less than the threshold level of near infrared light, (i) reliance on processing of the captured image data representative of visible light passing through the variable reflectance electro-optic mirror reflective element for the driver monitoring system of the vehicle is increased and (il) reliance on processing of the captured image data representative of near infrared light passing through the variable reflectance electro-optic mirror reflective element for the driver monitoring system of the vehicle is reduced.

16. The vehicular interior rearview mirror system of claim 15, wherein the vehicular interior rearview mirror system determines a level of visible light passing through the variable reflectance electro-optic mirror reflective element based on the determined near infrared light component of the captured image data.

17. The vehicular interior rearview mirror system of claim 16, wherein the vehicular interior rearview mirror system ignores the determined near infrared light component of the captured image data when determining the level of visible light passing through the variable reflectance electro-optic mirror reflective element.

18. The vehicular interior rearview mirror system of claim 15, wherein the interior rearview mirror assembly does not include a physical filter that attenuates non-visible light.

19. The vehicular interior rearview mirror system of claim 15, wherein the imaging sensor further operates as an ambient light sensor, and wherein the captured image data is processed at the ECU to determine ambient light, and wherein the vehicular interior rearview mirror system controls dimming of the variable reflectance electro-optic mirror reflective element further based on the determined ambient light.

20. A vehicular interior rearview mirror system, the vehicular interior rearview mirror system comprising:

an interior rearview mirror assembly comprising (i) a mounting base configured for attachment at an interior portion of a vehicle equipped with the vehicular interior rearview mirror system and (ii) a mirror head adjustable relative to the mounting base;

wherein the mirror head comprises a variable reflectance electro-optic mirror reflective element;

a glare light sensor disposed at the mirror head, wherein the glare light sensor captures sensor data representative of (i) visible light passing through the variable reflectance electro-optic mirror reflective element and (ii) near infrared light passing through the variable reflectance electro-optic mirror reflective element;

wherein the glare light sensor comprises an imaging sensor that captures image data for a driver monitoring system of the vehicle;

an electronic control unit (ECU), wherein the ECU comprises electronic circuitry and associated software, and wherein the electronic circuitry comprises a data processor for processing sensor data captured by the glare light sensor:

wherein the vehicular interior rearview mirror system, based on processing at the ECU of the captured sensor data, determines a near infrared light component of the captured sensor data;

wherein the vehicular interior rearview mirror system, based on processing at the ECU of the captured sensor data, controls dimming of the variable reflectance electro-optic mirror reflective element;

wherein the vehicular interior rearview mirror system does not rely on the determined near infrared light component of the captured sensor data when controlling dimming of the variable reflectance electro-optic mirror reflective element; and wherein, based on the determined near infrared light component of the captured sensor data being less than a threshold level of near infrared light, the captured sensor data representative of visible light passing through the variable reflectance electro-optic mirror reflective element is processed at the ECU for the driver monitoring system of the vehicle and the captured sensor data representative of near infrared light passing through the variable reflectance electro-optic mirror reflective element is not processed at the ECU for the driver monitoring system of the vehicle, and wherein, based on the determined near infrared light component of the captured sensor data being greater than or equal to the threshold level of near infrared light, the captured sensor data representative of near infrared light passing through the variable reflectance electro- optic mirror reflective element is processed at the ECU for the driver monitoring system of the vehicle and the captured sensor data representative of visible light passing through the variable reflectance electro-optic mirror reflective element is not processed at the ECU for the driver monitoring system of the vehicle.

21. The vehicular interior rearview mirror system of claim 20, wherein the vehicular interior rearview mirror system determines a level of visible light passing through the variable reflectance electro-optic mirror reflective element based on the determined near infrared light component of the captured image data.

22. The vehicular interior rearview mirror system of claim 21, wherein the vehicular interior rearview mirror system ignores the determined near infrared light component of the captured image data when determining the level of visible light passing through the variable reflectance electro-optic mirror reflective element.

23. The vehicular interior rearview mirror system of claim 20, wherein the imaging sensor comprises (i) at least one first photosensing element that captures image data representative of visible light, and (ii) at least one second photosensing element that captures image data representative of near infrared light.

24. The vehicular interior rearview mirror system of claim 20, wherein the interior rearview mirror assembly does not include a physical filter that attenuates non-visible light.

25. The vehicular interior rearview mirror system of claim 20, wherein the imaging sensor further operates as an ambient light sensor, and wherein captured image data is processed at the ECU to determine ambient light, and wherein the vehicular interior rearview mirror system controls dimming of the variable reflectance electro-optic mirror reflective element further based on the determined ambient light.

26. The vehicular interior rearview mirror system of claim 20, wherein captured sensor data is processed at the ECU to detect a headlight of a following vehicle.

27. The vehicular interior rearview mirror system of claim 20, further comprising an ambient light sensor disposed at the interior portion of the vehicle, wherein the ambient light sensor captures ambient light sensor data representative of (i) visible light at or near a windshield of the vehicle, and (ii) near infrared light at or near the windshield, and wherein the vehicular interior rearview mirror system controls dimming of the variable reflectance electro-optic mirror reflective element further based on processing at the ECU of the captured ambient light sensor data.

28. The vehicular interior rearview mirror system of claim 27, wherein the vehicular interior rearview mirror system, based on processing at the ECU of the captured ambient light sensor data, determines a near infrared light component of the captured ambient light sensor data, and wherein the vehicular interior rearview mirror system ignores the determined near infrared light component of the captured ambient light sensor data when determining a level of visible light at or near the windshield, and wherein the vehicular interior rearview mirror system adjusts dimming of the variable reflectance electro-optic mirror reflective element further based on the determined level of visible light at or near the windshield.

29. The vehicular interior rearview mirror system of claim 27, wherein the ambient light sensor is disposed at the mirror head.

30. The vehicular interior rearview mirror system of claim 20, wherein the glare light sensor further comprises an ambient light sensor that captures ambient light sensor data representative of (i) visible light and (ii) near infrared light, and wherein the vehicular interior rearview mirror system controls dimming of the variable reflectance electro-optic mirror reflective element further based on processing at the ECU of the captured ambient light sensor data.

* * * * *